No. 607,459. Patented July 19, 1898.
F. H. RICHARDS.
WEIGHING MACHINE.
(Application filed June 24, 1897.)
(No Model.) 7 Sheets—Sheet 2.
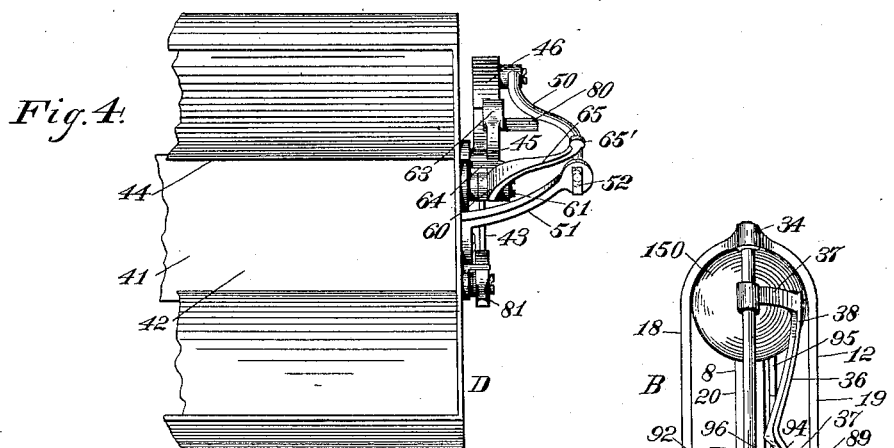
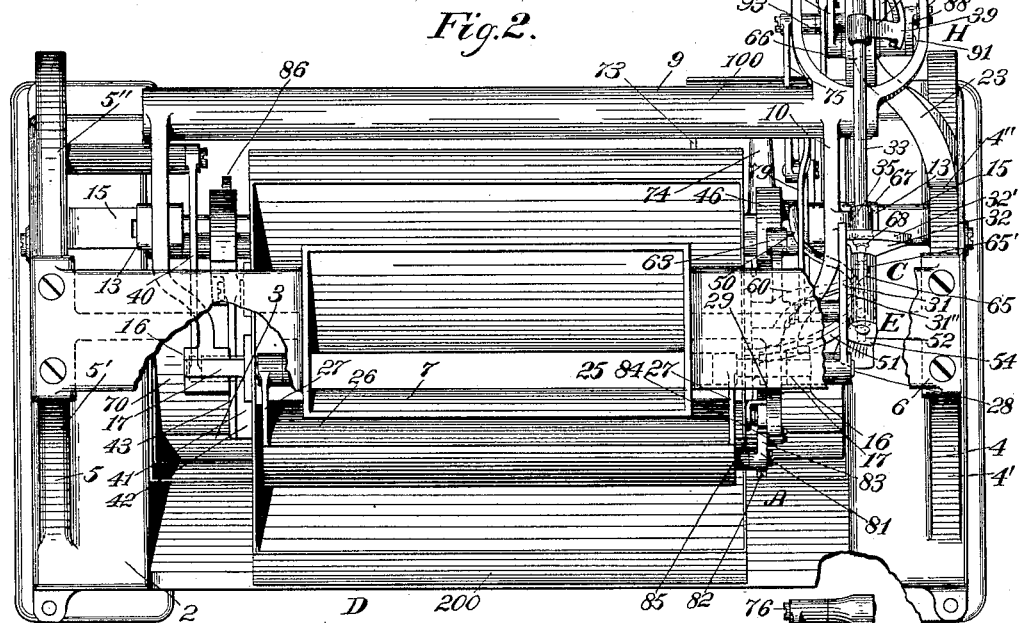
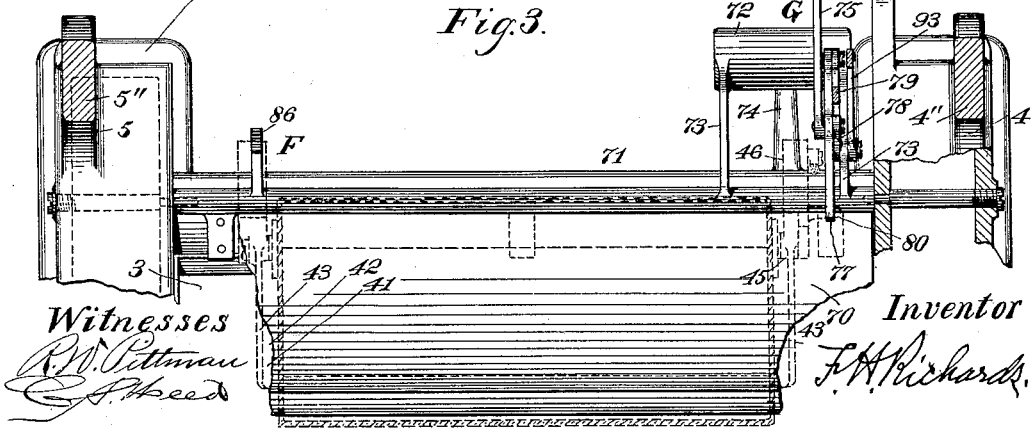
Witnesses
Inventor
F. H. Richards.

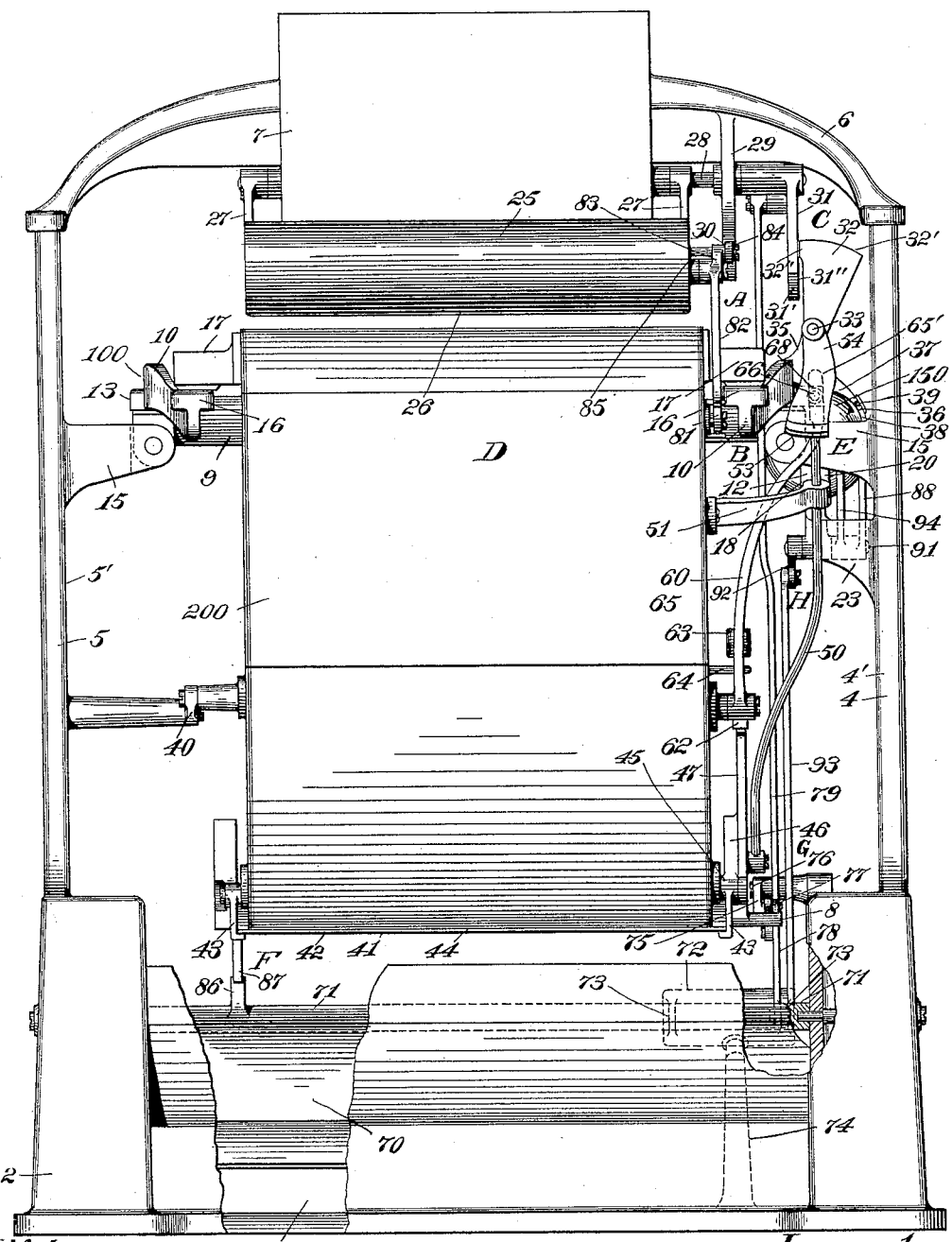

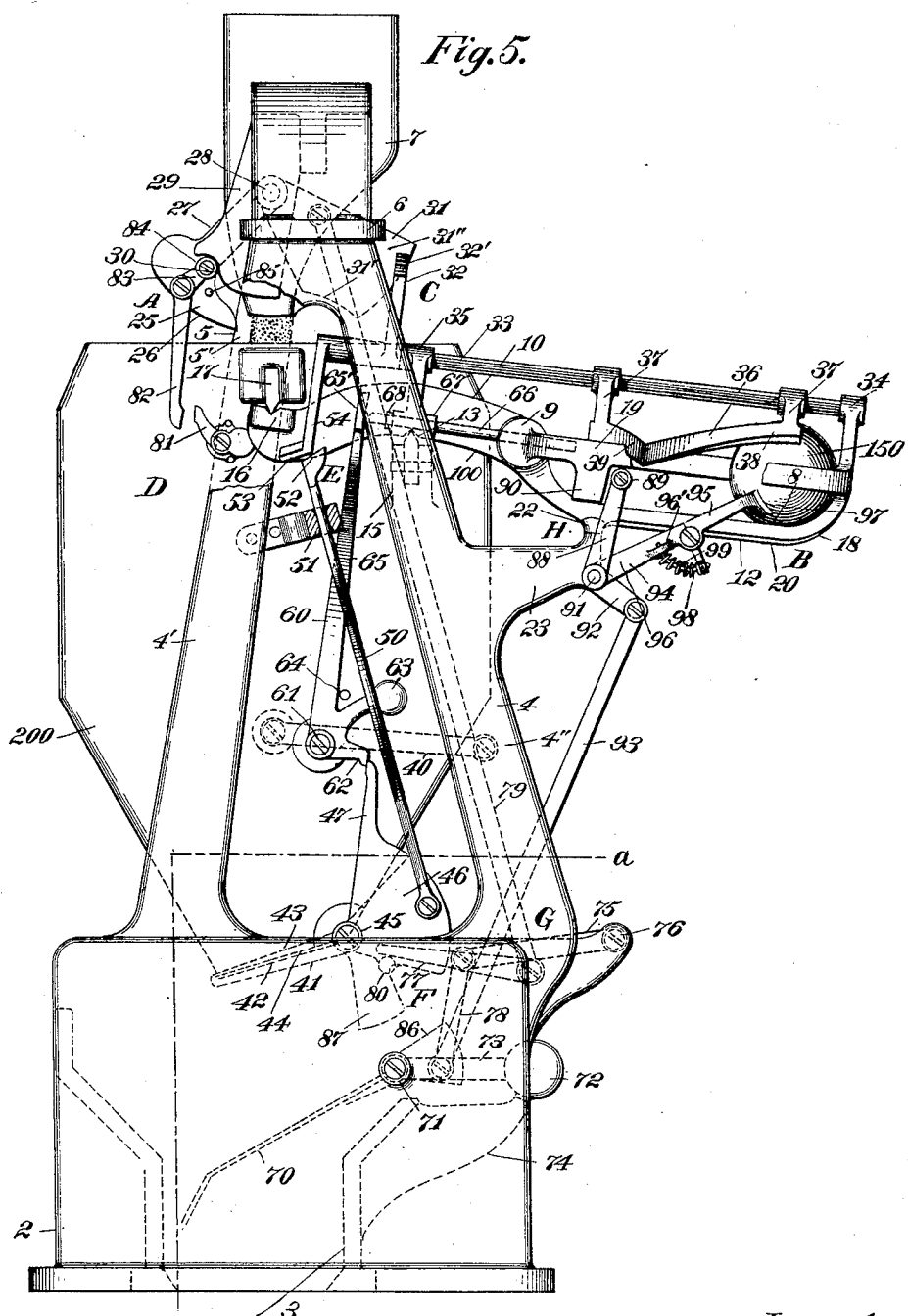

No. 607,459. Patented July 19, 1898.
F. H. RICHARDS.
WEIGHING MACHINE.
(Application filed June 24, 1897.)
(No Model.) 7 Sheets—Sheet 4.

Witnesses
Inventor

No. 607,459. Patented July 19, 1898.
F. H. RICHARDS.
WEIGHING MACHINE.
(Application filed June 24, 1897.)
(No Model.) 7 Sheets—Sheet 5.

Witnesses
R. W. Pittman

Inventor
F. H. Richards

No. 607,459.  
F. H. RICHARDS.  
WEIGHING MACHINE.  
(Application filed June 24, 1897.)

(No Model.)

Patented July 19, 1898.

7 Sheets—Sheet 6.

Witnesses.  
Inventor  
F. H. Richards,

No. 607,459. Patented July 19, 1898.
F. H. RICHARDS.
WEIGHING MACHINE.
(Application filed June 24, 1897.)
(No Model.) 7 Sheets—Sheet 7.
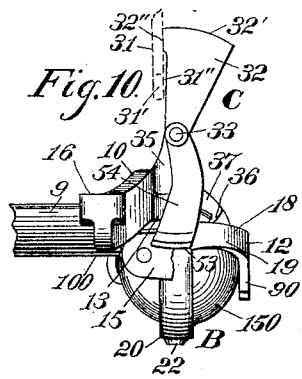
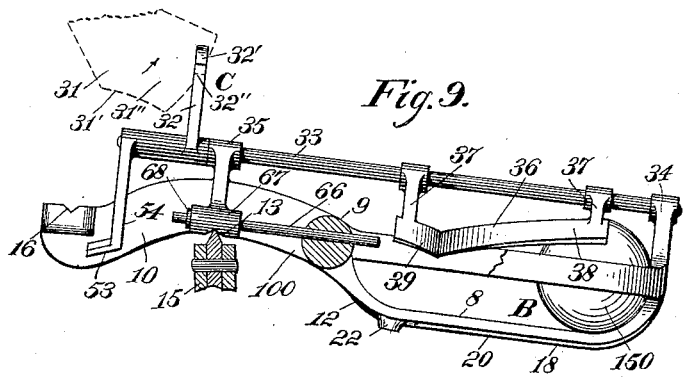
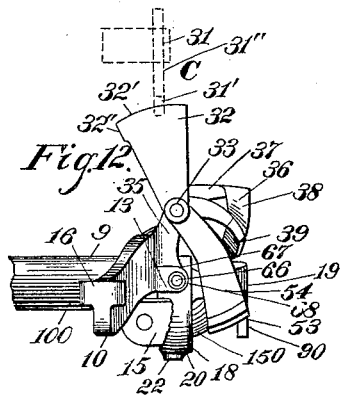
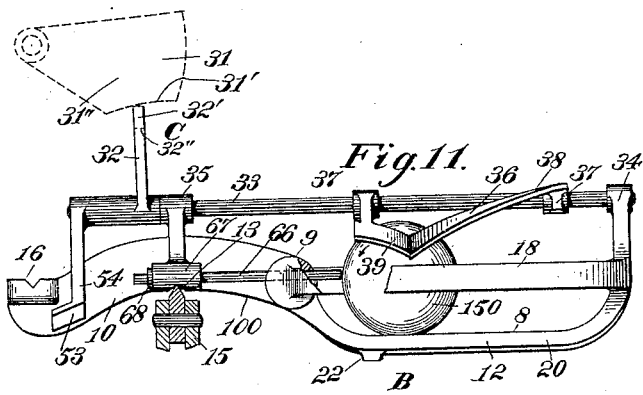
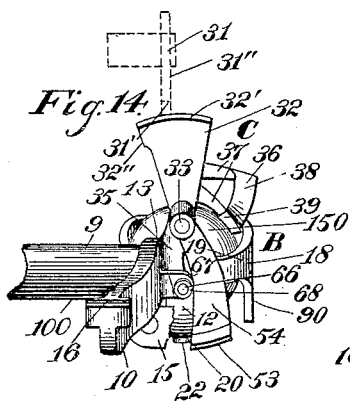
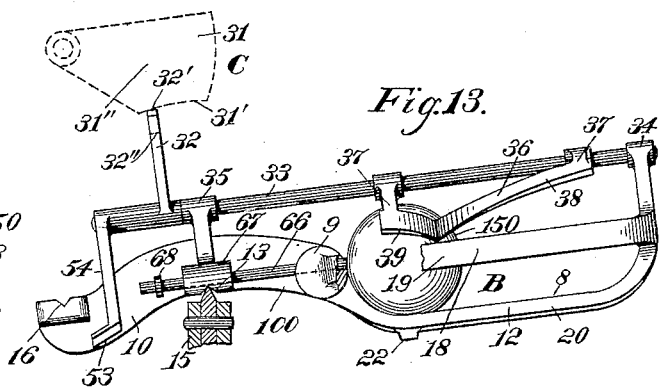
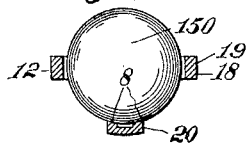
Witnesses
R. W. Pittman
C. H. Reed
Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,459, dated July 19, 1898.

Application filed June 24, 1897. Serial No. 642,047. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide a series of improved mechanisms combined and operable to produce an improved apparatus operative quickly and accurately to determine and weigh a load of material.

Figure 6:
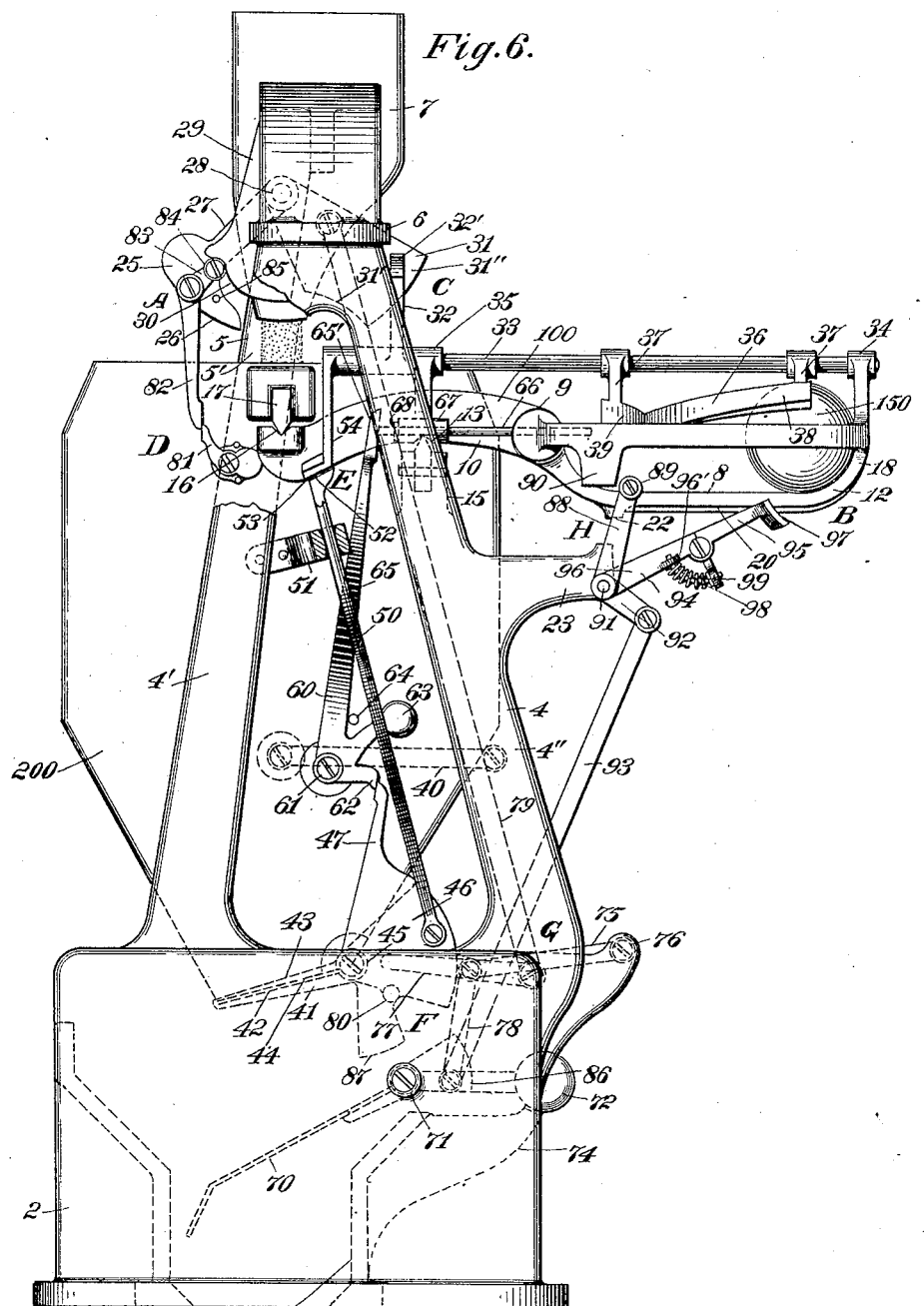
Figure 7:
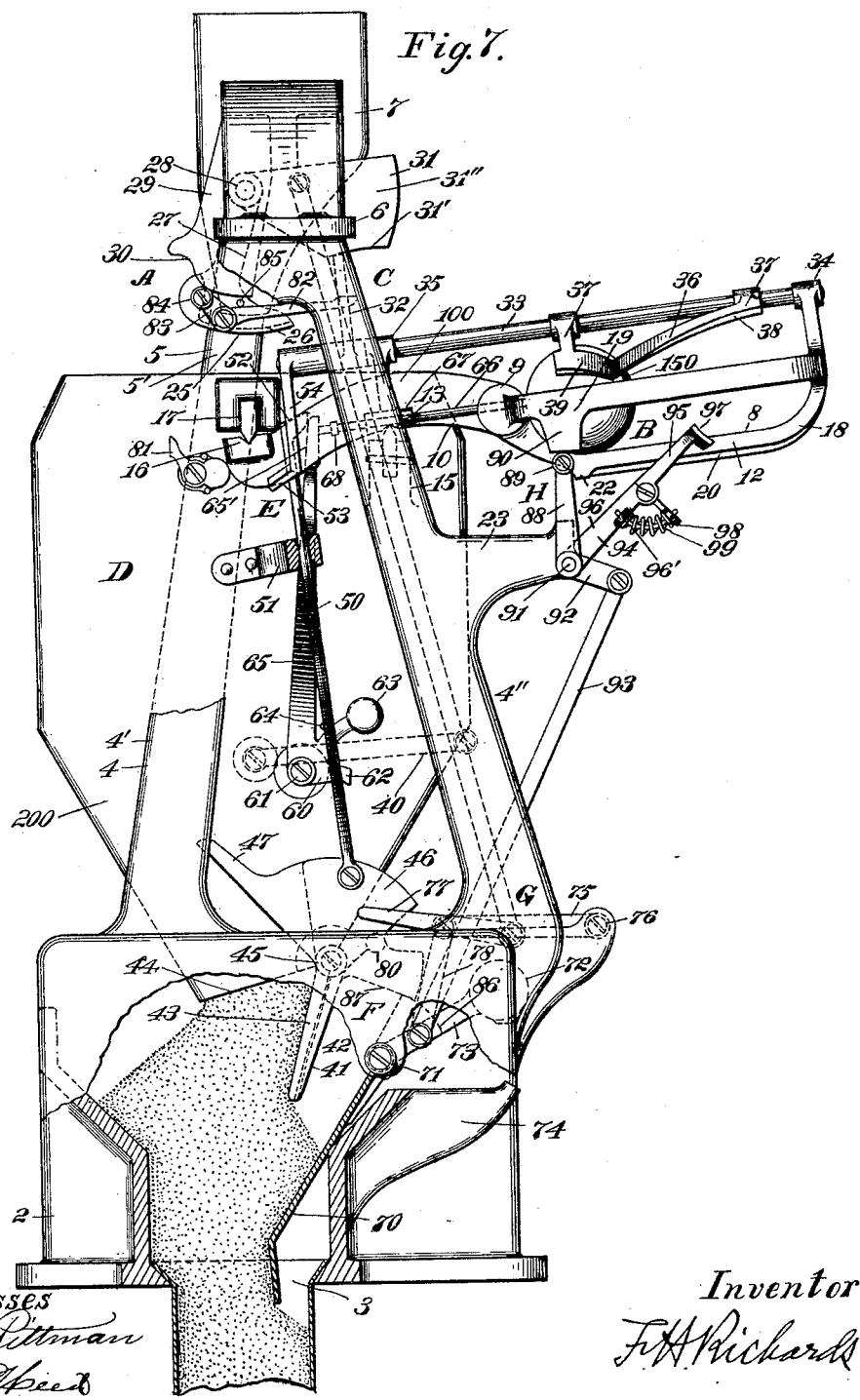
Figure 8:
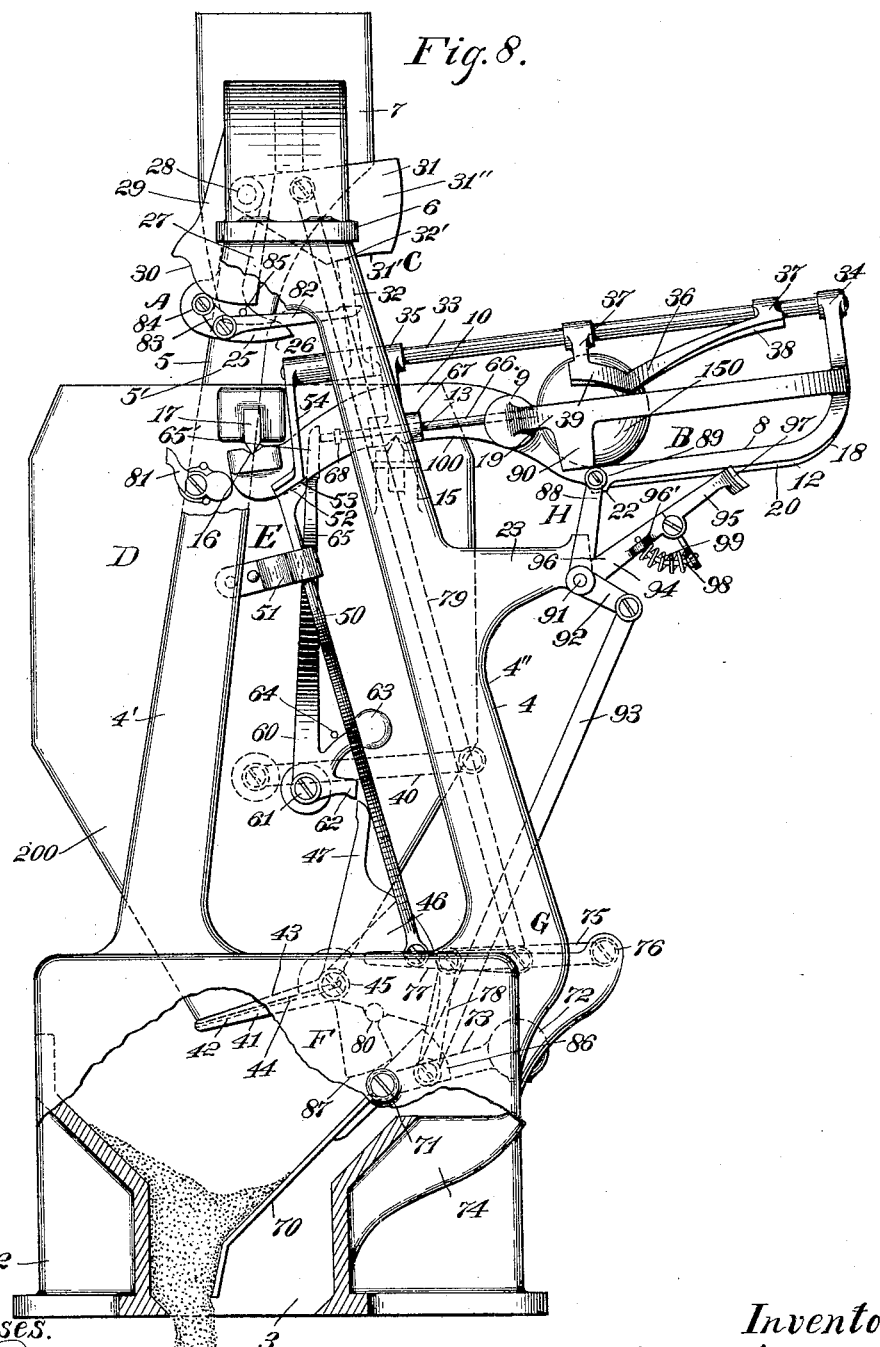

In the drawings accompanying and forming part of this specification, Figure 1 is a front view of this improved weighing apparatus with a part of the framework broken away. Fig. 2 is a top view thereof, likewise having a part of the framework broken away. Fig. 3 is a vertical horizontal sectional view taken in line *a a*, Fig. 5. Fig. 4 is a detail top view of the right-hand side of the load-receiver. Figs. 5, 6, 7, and 8 are side elevations of the apparatus shown in Fig. 1, said figures illustrating progressive views of the operating mechanisms. Figs. 9 to 14, inclusive, are side and end views of the beam mechanism in different positions and also show different positions of the locking means for the stream-controlling means or valve and the traveling counterbalancing means or weight; and Fig. 15 is a view of the traveling weight and a cross-sectional view of the weight-cage supporting the same.

Similar characters of reference designate like parts in all the figures of the drawings.

In a general way this weighing-machine comprises improved beam mechanism comprehending a shiftable or traveling counterbalancing means or weight operative directly to effect the discharge of a load, stream-controlling means, a load-receiver having a closer or stream-discharging means, and regulator or material-discharge-operated mechanism, all so combined and operable that in the preferred construction of apparatus herein shown the beam mechanism is adapted to control the operation of the stream-controlling means, preferably through the medium of the load-receiver and regulator mechanism, whereby by the direct action of said receiver on the ascent thereof the stream-controlling means is opened and maintained open and on the descent thereof is permitted to close.

The weighing-machine also comprises an improved organization of locking means, whereby the stream-controlling means is effective to maintain the counterbalancing means in its efficient position when said stream-controller is open, and the beam mechanism in turn is effective to lock said stream-controller closed during the load-discharging period of the receiver, and whereby the beam mechanism is also effective to maintain the closer shut during the loading period of the receiver, and the closer is effective to assist in maintaining the stream-controller against movement during the discharging period of said load-receiver, and whereby also the regulator mechanism is operative in connection with the closer to lock the same open and in connection with the beam mechanism to lock said beam mechanism against movement at a predetermined period during and after the discharge of the material from the load-receiver and to lock the traveling weight in its efficient position, and is also operative to prevent the premature discharge of a succeeding load from the receiver before all appreciable part of a preceding load has passed the regulator mechanism.

As a preface to a further description of this improved weighing apparatus it will be understood that various parts of the same could be more or less modified without departing from the general scope of the invention.

This improved weighing machine or apparatus comprehends, in the preferred form thereof herein shown and described, stream-controlling means, (designated in a general way by A,) beam mechanism, (designated in a general way by B,) and embodying a shiftable or traveling counterbalancing means or weight adapted to effect the discharge of a load, reciprocally-effective locking means (designated in a general way by C) for locking said stream-controlling means closed and for maintaining said weight in its normal position, a load-receiver (designated in a general way by D) supported by said beam mechanism and having a shiftable member or closer operative by said traveling weight to discharge a load, locking means (designated in a general way by E) for said closer and adapted to lock the stream-controller-locking means against movement, regulator mechanism, (designated in a general way by F,) means (designated in a general way by G) for opening and maintaining the stream-controlling means open and operative by the beam mechanism through the medium of the load-receiver and regulator mechanism, and locking means (designated in a general way by H) for the beam mechanism, and which locking means also acts to lock the stream-controller open.

The framework for carrying the operative parts of the machine may be of any suitable construction, but is herein shown comprising a base 2, constructed to form an outlet-conduit 3 for the discharging material, and which base is provided with a pair of side frames or uprights 4 and 5, each shown comprising a pair of members 4' and 4" and 5' and 5", said side frames being connected at their upper ends by a top plate 6, supporting a material-supply chute 7.

The beam mechanism (designated generally by B) for supporting the load-receiver, in the preferred form thereof herein shown and described, comprehends a beam 100, comprising a beam-shaft 9, having a pair of load-receiver-supporting arms 10 and a counterbalancing or load-weight-supporting instrumentality 12. This beam mechanism is shown pivotally supported by the side frames for oscillatory movement by means of suitable bearings, each of which in the present structure comprises a V-shaped bearing member 13 and a knife-edge pivot, the former shown carried by the receiver and the latter supported intermediate the furcated end of an inwardly-extending bracket 15. Each of the receiver-supporting arms in turn is also provided adjacent to its outer end with one member of a suitable bearing, which in the present instance is shown as a V-shaped member 16, adapted to support the companion member, shown as a knife-edge pivot 17, secured at the side of the load-receiver. The counterbalancing or weight-supporting instrumentality 12 in the present form of beam mechanism is shown in the nature of a cage 18, extending rearwardly from and rigidly connected to the beam-shaft 9, adjacent to one end thereof, and which cage comprises a plurality of inclosing members or bars, herein shown as three in number, two forming side bars adapted to maintain the weight in the cage and the other constituting a weight-track 20, and for this purpose it is shown consisting of two inwardly beveled or inclined members 8, adapted to carry the weight. Owing to the construction of this track the weight has a bearing-surface only on the track, whereby friction is reduced to a minimum. The cage is provided with a suitable stop 22, adapted to rest when the beam is in its normal position or position of rest on a rearwardly-extending bracket 23, carried by one of the side frames, preferably that one adjacent thereto.

The counterbalancing means or load-weight 150, forming a part of the beam mechanism, is shown as a rolling member, preferably spherically shaped and adapted to travel within the cage, whereby its efficient position can be varied and whereby at one period it constitutes the counterbalancing means for the load and at another period the means for directly effecting the discharge of such load in the manner hereinafter set forth. In the present construction the weight is shown having its complete traveling movement between the pivotal point of the beam and the outer end thereof, whereby the weight is always in position and effective to return the unloaded receiver to its normal position.

The stream-controlling means, (designated generally by A,) in the preferred form thereof herein shown and described, comprehends a valve 25, shown consisting of a valve-blade 26, having a pair of valve-arms 27 pivotally secured to the side walls of the supply-chute. One of the pivotal devices for said valve-arms is in the nature of a short rock-shaft 28, journaled in and extending beyond a downwardly-extending projection or bracket 29, having a cam face or edge 30 for the purpose hereinafter set forth. This valve is weighted in any suitable manner whereby it is self-closable. To maintain the valve closed during the load-discharging period and also to lock the load-weight against shiftable movement during the loading period, suitable locking means (designated generally by C) is provided for this purpose, and in the preferred form shown comprises a pair of members having movements in the same plane and one operative in planes intersecting the plane of movement of the other member, and in the structure shown these locking members comprise a pair of stops 31 and 32, one of which, as 31, is rigidly secured to the valve rock-shaft 28, whereby it is movable with the valve, and thereby to a certain extent may be considered, if desired, as constituting a part of the valve mechanism, while the other stop, as 32, is disposed with its axis in a plane at right angles to the axis of the valve-stop and is rigidly secured to a rock-shaft 33, journaled in a pair of supports or arms 34 and 35, carried by the beam, one, as 34, at the outer end of the beam-cage and the other, as 35, formed as a part of or secured to one of the receiver-supporting arms 10, whereby it to a certain extent may also be considered, if desired, as constituting a part of the beam mechanism. In order to carry or oscillate the beam-stop 32 into and out of engagement with the valve-stop 31 at the proper periods, suitable actuating means is provided, operative in the present form of apparatus directly by the traveling weight. This actuating member or actuator, which also constitutes a weight-locker and will therefore be designated in some instances as an "actuator-locker," in its preferred form comprises a member 36, rigidly secured to the rock-shaft 33 by arms 37, and has a pair of curved or inclined cam-faced members 38 and 39. The cam-faced member 38 has its outer end in position to bear on the traveling weight when in its load-counterbalancing position and is inwardly inclined into the path of the weight, its inner end being united to the cam-faced member 39, which curves outwardly from this point. By this construction it will be seen, Figs. 9 to 13, that on the inward movement of the weight the actuator will be forced outward, thereby moving the stop 32 by means of the rock-shaft 33 into position with its stop-face 32' beneath the valve-stop face 31, Figs. 11 and 12, the valve having previously closed and carried its stop upward, thereby to lock the valve against opening during the load-discharging period, and that when the weight has passed the juncture-point or apex of the cam-faced members the member 39 thereof tends to bear on said weight and hold it in position against return or shifting movement. It will also be seen that when the weight is in its normal load-counterbalancing position and the valve is open, owing to the engagement of the face 32" of the stop 32 with the side face 31" of the stop 31, outward movement of the actuator 36 is prevented, so that said weight is locked against inward movement so long as the valve is open, owing to the engagement of the inclined cam-faced member 38 with said weight, from which it will be seen that by means of the valve the traveling beam-weight is locked against premature movement and that by means of the beam mechanism the valve is locked closed during the discharge of the load from the receiver.

From the foregoing it will be seen that the beam-stop is shiftable in a plurality of planes—that is to say, owing to its oscillatory movement with the beam it is shiftable in a vertical plane on the descent and ascent of the weight-supporting arm of the beam and simultaneously therewith is shiftable in a plane transversely of its vertical plane, and that in addition to such planes of movement and independently of its oscillatory movements with the beam it also has, when oscillated into position to engage the valve-stop, a movement in a plane intersecting both of said first-mentioned planes of movement, so that said beam-stop is shiftable when oscillated with the beam in the same plane with the valve-stop and is also shiftable in a plane intersecting the plane of movement of said valve-stop.

The load-receiver (designated generally by D) may be of any suitable construction; but in the preferred form thereof herein shown and described it comprehends a receptacle or bucket 200, preferably of the single-chambered type or class and supported by the beam in the manner hereinbefore set forth.

A suitable connector or link 40 is pivotally secured to one of the members, as 4", of one of the side frames, as 4, and to the receptacle, whereby said receptacle is maintained in its proper position against lateral or swinging movement. This load-receptacle is provided with a suitable shiftable member, such as a closer, herein shown disposed at the lower end of the receptacle and adapted to discharge the material at the proper predetermined period. In the form shown this closer 41 comprises a closer-plate 42, carried by a pair of arms 43, one at each end thereof, and which are pivotally secured to the sides of the bucket, adjacent to the discharge-spout 44 thereof. Rigidly secured to the hub 45 of one of the closer-arms 43 is a working part or member 46, shown in the present structure as constituting the closer-weight and which is provided with an arm 47 in position to be engaged by a locker 60, hereinafter described.

To maintain the closer shut during the loading period of the receptacle and until the load has been accurately weighed, should the supplemental locking means hereinafter described be tampered with, suitable locking means is provided, and which forms a part of the closer-locking means, (designated generally by E,) and in the preferred form thereof herein shown comprises a shiftable member, such as a rod 50, one end of which is pivotally secured to the working member 46 of the closer, and which rod is guided and maintained in position by a suitable guide-arm 51, secured to the receptacle. The upper end of this rod 50 is provided with an inclined face 52 in position to be engaged by an inclined face 53 of a shiftable locker 54, shown in this case as a depending stop rigidly secured to the rock-shaft 33, preferably by means of the hub forming a part of the beam-stop 32, whereby said stop is shiftable with said beam-stop. By means of the coacting faces 52 and 53 of these members 50 and 54 it will be seen that upward movement of the member 50 will be prevented should the closer commence to open, whereby said closer will be maintained shut during the period above mentioned. On the opening of the closer by the means hereinafter set forth the locker-stop 54, having been previously shifted out of engagement with the rod or member 50, owing to the inward movement of the beam-stop 32 on the traveling movement of the weight, said rod 50 is carried upward into position in the rear of said depending locker 54, whereby said rod constitutes a locker for the beam-stop 32, thus affording an additional locker to maintain the valve closed while the closer is open.

From the foregoing it will be seen that the beam mechanism and also the stream-controlling means through the stops 31 and 32 and the locker 54 are effective to lock the closer shut, while the closer in turn is effective to lock the valve-locker, and thereby the valve, against opening movement.

The supplemental locking means for the closer, and which constitutes the other part of the locking means (designated generally by E) and forms the direct means for controlling the closer, comprises a locker 60, which in the construction shown is shiftably secured to the load-receptacle by a pivotal device 61, and is in the nature of a three-part member, one part of which constitutes the locker proper or latch, 62, for the closer-arm 47, above described, and thereby the closer, to lock the same shut, another part of which member carries a weight 63 for maintaining said locker in its normal position, a stop 64 being provided and carried by the receptacle for limiting the movement of said locker, while the other part of said locker comprises an upwardly-extending arm 65 in position to be engaged by an actuator 66, operative by the shiftable counterbalancing-weight 150, thereby to unlock the closer at the proper predetermined period to permit the discharge of the load. This closer-locker actuator 66 in the form shown comprises a rod mounted for reciprocatory movement in a sleeve 67, shown herein forming a part of the arm 35, carried by one of the receptacle-supporting beamarms 10. This rod also extends through an aperture formed in the beam-shaft 9, so that owing to its supports it is movable with the beam and is permanently in position to be actuated by the traveling weight at the proper predetermined period. The actuator is provided adjacent to its outer end with a collar 68, adapted to engage the outer end of the sleeve 67, whereby inward movement of said actuator is limited. The outer end of this actuator 66 is in position to engage an enlarged end 65' of the closer locker-arm 65, and which engagement takes place on the traveling of the weight into position to engage the opposite end of said actuator, thereby sliding such actuator into engagement with the locker-arm 65, whereby said locker is shifted to raise the latch 62 thereof and thus unlock the closer, which, owing to the weight of the load in the receptacle, will immediately open and discharge the load.

From the foregoing it will be seen that the inward traveling movement of the weight operates to unlock the closer by its engagement with the actuator, so that the closer is controlled by the beam mechanism.

In the apparatus shown suitable regulator mechanism (designated generally by F) is provided for controlling one or more of the mechanisms constituting a part of the machine, and in the present structure the stream-controlling means and also the beam mechanism are shown controlled during a part of the operation of the apparatus by or through the medium of said regulator mechanism. In the preferred form thereof herein shown and described this regulator mechanism comprises a suitable regulator-plate 70, carried by a rock-shaft 71, journaled in the side walls of the base 2, and which rock-shaft is provided with a counterbalancing-weight 72, shown herein carried by a pair of rearwardly-extending arms 73, extending from the rock-shaft 71, whereby the regulator is held in its normal position. This counterbalancing-weight 72 is herein shown for the purpose hereinafter set forth of greater gravity than the stream-controlling valve. The downward movement of this weight, and thereby the upward movement of the regulator-blade, is limited by a suitable stop 74, shown herein as a bracket or arm extending rearwardly from the base and upon which said regulator-weight is adapted to rest when in its normal position or position of rest. As in this preferred construction of apparatus the stream-controlling means is partly controlled through the medium of the regulator mechanism suitable connecting means is shown intermediate the regulator and said stream-controller, whereby it will be opened and maintained open, and thereby to a certain extent locked open through the medium of said regulator mechanism, which constitutes main or primary means for maintaining the stream-controller open. In the preferred form thereof this connecting mechanism comprises a series of shiftable members, such as levers. The main or supporting member 75 is pivotally secured to the framework, as at 76, its opposite end having pivotally secured thereto adjacent to the center of its length an actuator member 77, and which members are in turn connected with one of the weight-carrying arms 73 of the regulator-blade by a suitable connecting member 78, which is pivotally secured at its lower end to said weight-arm and at its upper end with said actuator member and the main member, preferably at the pivotal point thereof, so that the tendency of the regulator-weight when in its normal position is to draw the pivotal point of said actuator 77 with the main member 75 downward. Pivotally secured to the outer end of this actuator member 77 is one end of a suitable connector 79, the opposite end of which is pivotally secured in this form of apparatus to the valve-stop 31, at one side thereof, whereby the regulator mechanism by means of the load-receptacle, in the manner about to be described, will open and maintain the valve open. Carried by the working member 46 of the closer is a suitable laterally-extending projection 80, which is in position to engage the free end of the actuator member 77 and constitutes a fulcrum therefor.

From the foregoing it will be seen that when the load-receptacle is in its normal or main-load-receiving position the engagement of the fulcrum projection 80 with the actuator member 77 maintains the valve open, as owing to the action of the beam-weight in maintaining the load-receiver in such normal position the free end of said actuator 77 is forced up by the projection 80, whereby said actuator 77 draws the connector 79 downward and consequently the valve-stop 31, thereby maintaining the valve open. On the descent of the receptacle to its poise position this fulcrum moves away from the actuator member 77, thereby permitting the same to hang free, whereupon the tendency of the valve, owing to its weight, is to close. This closing movement of the valve, however, is prevented at this time and until the receptacle has received its complete load, and for this purpose suitable means is provided, which is herein designated for the purposes of this specification as "supplemental means" or "supplemental maintaining means," and is herein shown in the nature of a weighted by-pass 81, pivotally carried by the receptacle and adapted to engage a depending arm 82 of a toggle member 83, pivotally secured at one side of the valve. This toggle member 83 is provided with a friction-roll 84, adapted to engage the cam-face 30 of the bracket 29, hereinbefore described. On the descent of the bucket to its poising position and the consequent release of the actuator 77 the valve has a slight closing movement, sufficient, however, to carry the arm 82 into position to engage the by-pass 81, which thus prevents the further movement of the valve until a complete load has been received, at which time the further descent of the load-receiver carries the by-pass 81 free of the arm and permits the valve, owing to its weight, to close. On the closing of the valve the arm 82 of the toggle member 83, owing to the action of the friction-roll 84 on the cam-face 30 of the bracket 29, is carried into a horizontal position, the upward movement of said arm being limited by a suitable stop 85, carried by the valve. On the opening of the valve the arm will be actuated into its depending position and pass the by-pass in readiness to reëngage said by-pass at the proper time. By means of this toggle member 83 the strain of the weighted valve when the arm 82 is in engagement with the by-pass is carried by the cam-faced bracket 29, instead of being carried by said by-pass 81, as would be the case without the provision of such toggle member and bracket, so that the weighted valve has no tendency to affect the proper and easy poising of the load-receptacle. On the return of the regulator 70 into its normal position after the complete passage of the discharged material by the same the descent of the regulator-weight 72 draws the actuator member 77 downward, so that on the ascent of the load-receptacle the engagement of the fulcrum projection 80 with said actuator member 77 operates to move the free end thereof upward and thus draw the connector 79 downward and therewith the valve-stop, thereby opening the valve, which is maintained in open position by the constant engagement of this fulcrum-point with the actuator 77, due to the beam and regulator weights, the latter of which is of greater gravity than the valve. It will also be observed that the engagement of the actuator 77 with the projection 80 tends to assist in locking the closer shut, due to the weight of the valve and the beam-weight acting in opposition to each other, so that a series of three independent locking means is operative to maintain the closer shut.

From the foregoing it will be seen that on the descent of the load-receptacle the actuator 77 is permitted to hang free, whereby the valve commences to close, the closing movement thereof being limited by the supplemental by-pass locker 81, which, however, descending with the load-receptacle as the same passes its poise position, likewise in turn releases the valve and permits the same completely to close and be locked closed by means of the beam mechanism and closer in the manner hereinbefore set forth. From the foregoing it will also be seen that the beam mechanism opens the valve and maintains the same open through the medium of the load receiver and regulator mechanism and also directly locks said valve closed without intermediary mechanism.

It is deemed preferable to lock the closer open and so insure the passage of all appreciable amount of material from the load-receptacle, and for this purpose suitable locking means, shown herein intermediate the closer and regulator, is provided, and which in the preferred form thereof comprises a pair of stops 86 and 87, one, as 86, carried by the regulator-shaft 71, and the other, as 87, carried by one of the closer-arm hubs, whereby on the opening of the closer and the consequent operation of the regulator by the discharging load the stops engage each other and lock the closer open until the return movement of the regulator, at which time the unlocking of the closer takes place and the same is permitted to close.

In order to lock the beam mechanism, and thereby the counterbalancing-weight, in its inefficient or ineffective position during the discharge of the load-receiver and prevent the return of said beam, and thereby the load-receiver, to its normal position until all appreciable amount of material has passed from said receiver, suitable locking means (designated generally by II) is provided and in the preferred form thereof shown is operatively connected with the regulator for operation thereby and comprises a locker 88, having a friction-roll 89, adapted to engage a stop 90, shown carried by one of the side bars 19 of the scale-beam-weight cage. This locker 88 is rigidly secured to one end of a short rock-shaft 91, journaled in the bracket 23, the opposite end of said rock-shaft having a short arm 92 rigidly secured thereto, the outer end of which in turn has pivotally connected thereto a suitable connector 93, the opposite end of which is pivotally secured to one of the regulator-weight arms, by which, on the operation of the regulator by means of the discharging load, the locker 88 is carried into position, the beam-cage having previously been moved upward on the descent of the loaded receptacle to engage the stop 90 and lock said scale-beam cage against downward or return movement until all appreciable amount of material has passed from the regulator-blade. This locking means (designated generally by II) also acts to lock the regulator mechanism against movement while the beam mechanism is in its normal position or position of rest or is moving to its poise position, and by locking the regulator mechanism against movement it locks and thereby assists in maintaining the stream-controller open and so prevents tampering therewith, and thus acts to assist the main or primary means which maintain said stream-controller open. This result is due to the position of the friction-roll 89 of the arm 88, which is in the rear of the stop 90, carried by the beam when said beam is in its normal position, whereby it will be seen that until the beam ascends beyond its poising position the regulator-weight 72 cannot be raised or appreciably shifted from its arm-rest 74, as in such case the roll 89 would engage the stop 90, while, as before stated, the regulator-weight 72 is heavier than the valve-weight, so that as long as the fulcrum projection 80 of the closer is in engagement with the actuator 77 the stream-controller will be maintained open, yet without the beam-locking means II said stream-controller might be tampered with and forcibly moved toward its closing position before the load-receiver is ready to descend, whereby the stop 31 would be swung upward, carrying the lever 79 therewith and drawing up the rear end of the actuator 77, which would act through its pivot intermediate its ends to draw up the connector 78 and the regulator-weight arm 73; but as the regulator-arm, and thereby the regulator-blade, is locked against ascent by the locking means II it will be seen that the stream-controller cannot be moved toward its closing position even in this manner. It will be observed, however, that the by-pass 81 would prevent the valve from closing entirely, even if tampered with in the manner above set forth.

From the foregoing it will be seen that on the first or early part of the return movement of the regulator the closer will be unlocked from its open position, thereby to permit its return, and on the second or next part of the return movement of said regulator the beam will be unlocked, at which time the shiftable weight will travel to its normal position and unlock the valve from its closed position, and that on the final part of the return movement of said regulator the supply-valve will be opened, owing to the engagement of the fulcrum projection 80 with the actuator 77, connected with the regulator. Furthermore, it will be seen that owing to the beam-weight, by which the load-receptacle is moved upward into its normal load-receiving position, the valve is opened and maintained open, so that in this form of apparatus the beam mechanism constitutes the primary means for opening and for maintaining the valve open, said beam mechanism operating through the load-receptacle and the regulator mechanism to accomplish this purpose.

It will be understood that the fulcrum projection 80, if preferred, may be disposed in any other suitable position instead of being carried by the working member 46.

Rigidly secured to the rock-shaft 91, carrying the locker 88, is an outwardly-extending arm 94, adapted to form a rest and supplemental locker for the counterbalancing-weight 150 when in its normal position. This supplemental locker in the form shown herein preferably comprises a pair of pivotally-connected members 95 and 96, the end member 95 thereof being provided with a concaved seat 97 for the weight and with a depending projection or arm carrying a curved rod 98, the opposite end of which projects into and slides in an aperture of an ear 96', carried by the inner member 96 of said rest. Mounted on this curved rod 98 is a spiral spring 99, adapted to hold the member 95 in position against depression by the traveling weight. From the above it will be seen that this arm 94 by its engagement with the weight when in its position of rest will prevent any shifting movement thereof should a slight play be provided intermediate the weight and cam-faced-actuator locker. On the ascent of the beam-cage the weight is disengaged from the supplemental locker and is then held against movement by the main actuator-locker 36 through the medium of the coacting stops 31 and 32 until the closing of the valve, at which time the weight is unlocked and permitted to shift. It will also be seen that this supplemental locker is maintained in its proper weight-engaging position by the regulator mechanism.

The operation of this improved weighing-machine is substantially as follows: The operating mechanisms being in the positions shown in Fig. 5—the closer locked shut, the valve locked open, and the scale-beam weight 150 locked in its effective position—after the load-receiver has received the major part of its load it commences to descend to its poising position, at which time the weight 150 is carried, with its cage, into its load-counterbalancing position, whereby the closer fulcrum projection 80 is free of the actuator 77, whereupon the valve commences to close, the closing of the valve at this time, however, being prevented by the supplemental maintaining means 81, carried by the bucket. (See Fig. 6.) When the complete load has been received by the bucket, the further descent thereof operates to release the valve from its open position, whereupon said valve closes, simultaneously with which the valve-stop 31 is shifted upward. This descent of the load-receiver below its poising position operates to carry the valve-cage farther upward into an inclined position, Fig. 7, during which the weight 150 travels inward and downward, first operating the actuator-locker 36, which rocks the shaft 33 and so carries the beam-stop 32 into position to engage the valve-stop 31, and thereby lock the valve closed. This rocking movement of the rock-shaft 33 also carries the depending locker 54 laterally to unlock the closer, so that on the continued inward movement of the shiftable weight 150 the actuator 66 is engaged, whereby the closer-locker 60 is shifted and the closer completely unlocked, which, owing to the weight of the load in the receiver, opens, whereupon the load is discharged, from which it will be seen that the valve is first securely locked closed through the instrumentality of the beam-weight and is then opened by the same instrumentality. The opening of the closer carries the locker-rod 50 into position to prevent the return movement of the beam-stop 32 and the consequent unlocking of the valve while the closer is open. The discharge of the material from the receptacle operates to move the regulator into position to permit the stop 86 to engage the closer-stop 87, and thereby lock the closer open. This movement of the regulator also carries the scale-beam locker 88 into position to engage the stop 90 and so lock said scale-beam against return movement, and thereby also lock the beam-weight in its inefficient position, whereby the load-receiver is prevented from returning prematurely to receive a succeeding load. After all appreciable amount of material has passed from the regulator the latter, by means of its weight 72, commences to return, during the first part of which return movement it operates to unlock the closer, Fig. 8, permitting the same to close, which closing movement draws the locker-rod 50 downward and unlocks the beam-stop 32', the second part of said return movement operating to move the locker 88 out of engagement with the scale-beam stop 90, whereupon the return movement of the scale-beam and the ascent of the load-receptacle take place, during which the weight 150 commences to return to its normal effective position. This return of the weight 150, after its passage by the apex of the cam-faced actuator-locker 36, permits the return of said actuator-locker, owing to its weight, into its normal position, thereby rocking the shaft 33 and carrying the beam-stop 32 out of engagement with the valve-stop 31, so that the valve can be opened. The return of the scale-beam is not retarded by the coacting stops 31 and 32, owing to the contour of the under face 31' of the valve-stop 32, as during the return of said scale-beam, the valve being still locked closed, the stop 32 moves in the arc of a circle beneath the stop 31. The return of the beam-weight into its effective position permits the actuator 66 to be moved into its normal position by the weight 63 of the closer-locker 60, whereupon said locker 60 locks the closer shut. The further and complete return movement of the regulator then acts to draw the actuator 77 downward, which engages the fulcrum projection 80, carried by the receptacle, whereby the valve is opened and maintained open to permit the load-receptacle to receive a succeeding load, said valve being locked open by the mechanism H in the manner hereinbefore set forth. In practice this downward movement of the actuator 77 occurs practically simultaneously with the latter part of the return or ascent of the load-receiver.

In conclusion it will be seen that by this improved organization of locking means the scale-beam weight is locked against movement by the stream-controller or valve; that the valve in turn is locked closed by the beam mechanism and maintained shut by the closer; that the closer is locked shut by the beam mechanism and is also locked shut by an independent locker operative to unlock the closer by the direct contact of the shiftable or traveling weight therewith, and which locking action is assisted by the combined action of the stream-controlling means and beam mechanism; that by means of the regulator mechanism the closer is locked open, the beam mechanism, and thereby the load-receiver, locked against return movement, and the weight also locked in its efficient position; that the opening of the stream-controller or valve and both the maintaining and the locking open of the same is effected by the beam mechanism through the medium of the load receiver and regulator mechanism, and that such instrumentalities operate to maintain and lock the stream-controller open during a predetermined period and then release the same, whereupon, owing to its self-closing action, it moves into position to be engaged by the by-pass 31, carried by the load-receiver and which, as hereinbefore set forth, constitutes supplemental maintaining means for the stream-controller, so that such receiver is directly operative in different positions to maintain the valve open—that is to say, in its normal position, or that position in which it receives the major part of its load, it maintains the stream-controller wide open and on its movement to its poising or load-discharging position it operates by an independent means also to maintain said stream-controller open.

Having thus described my invention, I claim—

1. The combination with a load-receiver provided with a shiftable member operative to discharge a load; locking means for locking said shiftable member against movement; beam mechanism supporting said receiver and embodying a rolling counterbalancing means; and a reciprocatory rod non-connected with said locking means and mounted on said beam mechanism and in position intermediate said traveling counterbalancing means and locking means to engage said locking means on the engagement of said traveling counterbalancing means with said rod, thereby to unlock said load-discharge member and permit the discharge of a load.

2. In a weighing-machine, the combination with a load-receiver and with means operative to discharge a load, of a pivotally-supported beam carrying said receiver; traveling counterbalancing means carried by said beam at the outer end thereof at one period, the complete traveling movement of said counterbalancing means taking place intermediate the pivotal point of said beam and the outer end thereof, whereby said counterbalancing means is always in position and effective, at that side of the beam-pivot opposite to that at which the load-receiver is carried, to return said load-receiver to its normal position; and means carried independently of the load-receiver and operative on the traveling movement of said traveling counterbalancing means to effect the operation of said load-discharging means and thereby permit the discharge of a load.

3. The combination with a load-receiver, of means operative to discharge a load; locking means for locking said load-discharging means in position; a pivotally-supported beam carrying said load-receiver; traveling counterbalancing means carried by said beam at the outer end thereof at one period, the complete traveling movement of said counterbalancing of means taking place intermediate the pivotal point of said beam and the outer end thereof, whereby the counterbalancing means is always in position and effective at that side of the beam-pivot opposite to that at which the load-receiver is carried, thereby to return said load-receiver to its normal position; and an actuator mounted on said beam and operative on the movement of said counterbalancing means to unlock the load-discharging means and permit the discharge of a load.

4. The combination with a load-receiver provided with a shiftable member operative to discharge a load, of locking means for maintaining said shiftable member shut; beam mechanism supporting said receiver and embodying a beam having a load-receiver-supporting arm, and a spherically-shaped traveling weight carried by said beam at the outer end thereof at one period, the complete traveling movement of said weight taking place intermediate the pivotal point of said beam and the outer end thereof, whereby the weight is always in position and effective, at that side of the beam-pivot opposite to that at which the load-receiver is carried, to return said receiver to its normal position; and a reciprocatory rod out of contact with said locking means at one period and mounted on said beam-arm in parallelism therewith, said rod having one end thereof in position to be engaged by said weight, and its opposite end in position to engage said locking means on the traveling movement of said weight in one direction, thereby to unlock the shiftable member and permit the same to open and discharge a load.

5. In a weighing-machine, the combination with a load-receiver, of means operative to discharge a load; locking means for locking said load-discharge means in position against movement; a beam supporting said receiver; a traveling weight carried by said beam; an actuator supported in position free of the load-receiver and operative to unlock the load-discharge means on the traveling movement of said weight; and means for locking said weight against traveling movement at one period, thereby to prevent the operation of said actuator.

6. In a weighing-machine, the combination with a load-receiver, of means operative to discharge a load; locking means for locking said load-discharge means in position against movement; a beam supporting said receiver; a rolling weight carried by said beam; an actuator carried on the beam and operative to engage said locking means on the traveling movement of the weight, thereby to unlock said load-discharge means; and means for locking said rolling weight against traveling movement at one period, thereby to prevent the operation of said actuator.

7. In a weighing-machine, the combination of weighing mechanism embodying a beam; stream-controlling means for said weighing mechanism; and means carried by said beam and operative in the same plane of movement as, and in a plane transversely to, the plane of movement of said beam for locking said valve mechanism shut.

8. The combination with a load-receiver; a beam supporting said receiver; a regulator; and means intermediate said regulator and beam, and operative to lock the regulator against movement during a predetermined period, and operative with the regulator, on the shifting of the beam, to lock said beam against movement during another predetermined period.

9. The combination with weighing mechanism embodying beam mechanism having a traveling weight; a regulator; and means coacting with said beam mechanism to lock said regulator against movement during a predetermined period, and operative with the regulator, on the shifting of said beam mechanism, to lock said beam mechanism against movement, and thereby hold the weight in its inoperative position, during another predetermined period.

10. The combination with stream-controlling means, of weighing mechanism embodying a traveling weight; and means operative by said weight to lock said stream-controlling means shut.

11. The combination with stream-controlling means, of weighing mechanism embodying traveling counterbalancing means, said stream-controlling means and counterbalancing means being reciprocally effective to lock the counterbalancing means against traveling movement, and the stream-controlling means in one position.

12. In a weighing-machine, the combination with stream-controlling means, of weighing mechanism embodying beam mechanism provided with traveling counterbalancing means, said stream-controlling means and beam mechanism being reciprocally effective to lock the counterbalancing means against traveling movement, and the stream-controlling means shut.

13. The combination with stream-controlling means, of weighing mechanism; and locking means for said stream-controlling means, and comprising a plurality of members, one of said members being disposed in position to have movements in intersecting planes, whereby at one predetermined period it is operative in one plane to engage the other member, and thereby lock the stream-controlling means, and is operative at another period in all of its planes of movement to disengage said member and thereby unlock said stream-controlling means.

14. The combination with stream-controlling means, of weighing mechanism; and locking means for locking said stream-controlling means shut, and comprising a pair of movable members, one operative in a plane intersecting the plane of movement of the other member.

15. The combination with stream-controlling means, of weighing mechanism embodying a traveling weight; and locking means operative to lock the stream-controlling means shut when the weight is in its ineffective position, and to lock the weight in its counterbalancing position when the stream-controller is open.

16. The combination of a stream-controller, of weighing mechanism embodying a shiftable weight; and locking means operative to lock the stream-controller shut when the weight is in its ineffective position, and to lock the weight in its effective position when the stream-controller is open, and comprising a pair of members operative in intersecting planes.

17. The combination with a stream-controller, of weighing mechanism embodying a shiftable weight; and locking means operative to lock the stream-controller shut when the weight is in its ineffective position, and to lock the weight in its effective position when the stream-controller is open, and comprising a pair of members, both of said members having movements in the same plane, and one also having a movement in a plane intersecting the plane of movement of its companion member.

18. The combination with stream-controlling means, of weighing mechanism embodying beam mechanism having a traveling weight; locking means operative to lock the stream-controlling means shut and to assist in maintaining the weight in its ineffective position, and having a part thereof controlled by said weight on the traveling movement thereof.

19. The combination with stream-controlling means, of weighing mechanism embodying a traveling weight; locking means for said stream-controlling means, and an actuator operative by said weight on its traveling movement, thereby to lock the stream-controlling means shut.

20. In a weighing-machine, the combination with a supply-valve and with a stop movable therewith, of weighing mechanism embodying beam mechanism provided with a shiftable weight; a stop movable with said beam mechanism; and an actuator operative by said weight to shift said beam-stop into position to engage the valve-stop, thereby to lock the valve shut.

21. The combination with a supply-valve and with a stop movable therewith, of weighing mechanism embodying beam mechanism provided with a traveling weight; a stop carried by said beam mechanism and having a movement in a plane intersecting the plane of movement of said valve-stop; and an actuator carried by said beam mechanism and operative by the weight on the traveling movement thereof to actuate said beam-stop into position to lock the valve shut.

22. The combination with a supply-valve having a stop operative therewith, of weighing mechanism embodying beam mechanism provided with a rolling weight; a stop movable with said beam mechanism in the same plane of movement as the plane of movement of said valve-stop, and also operative independently of its movement with the beam mechanism, in a plane intersecting the plane of movement of said valve-stop; and a stop-actuator carried by said beam mechanism, and operative by the weight, on the traveling movement thereof, to shift said beam-stop in its intersecting plane to engage the valve-stop and lock the valve shut.

23. The combination with a supply-valve, of weighing mechanism embodying beam mechanism provided with a traveling weight; locking means for said valve and weight, and comprising a pair of stops, one operative with the valve and the other with the beam mechanism; and an actuator carried by said beam mechanism and operative by the weight to shift said beam-stop into position to lock the valve-stop when the valve is shut, said valve-stop coacting with the beam-stop when the valve is open to lock the weight in its effective position.

24. The combination with stream-controlling means, of weighing mechanism embodying beam mechanism having a traveling weight; an actuator-locker carried by the beam mechanism; and coacting means intermediate said beam mechanism and stream-controlling means, and operative by the traveling weight, through the medium of said actuator-locker, to lock the valve shut, and also operative at another period when the valve is open to lock the beam-weight in its effective position.

25. In a weighing-machine, the combination with a stream-controller, of weighing mechanism embodying beam mechanism including a traveling weight; a load-discharge-operated regulator; primary means, connecting said regulator and stream-controller, for maintaining said stream-controller open; locking means coacting with said regulator and beam mechanism for locking said stream-controller in its open position during a predetermined period, thereby to prevent tampering therewith; and supplemental means operative to maintain said stream-controller open during a partial descent of the load-receiver after said controller is unlocked by said locking means and released by said primary means.

26. The combination with a load-receiver, of a beam supporting said receiver; a rolling weight carried by said beam; and automatically-operative locking means adapted to hold said rolling weight against movement during each loading period of the load-receiver.

27. The combination with a load-receiver, of a beam supporting said receiver; a spherically-shaped rolling load-weight movable on the upper plane of said beam and supported adjacent to the outer end thereof at one period; and automatically-operative locking means for locking said weight adjacent to the outer end of said beam on the return of the weight after each weighing operation.

28. The combination with stream-controlling means, of weighing mechanism embodying beam mechanism provided with a traveling weight; a locker operative to hold said weight in its effective position; and coacting means intermediate said stream-controlling means and beam mechanism, and adapted to maintain said locker in its locking position.

29. The combination with stream-controlling means having a shiftable stop, of weighing mechanism embodying beam mechanism provided with a traveling weight; a locker carried by said beam mechanism; and a shiftable stop also carried by said beam mechanism and coacting with the valve-stop to lock the weight in its effective position through the medium of the locker.

30. The combination with a supply-valve having a shiftable stop, of weighing mechanism embodying beam mechanism provided with a traveling weight; a cam-faced actuator-locker carried by said beam mechanism, and a shiftable stop also carried by said beam mechanism and coacting with the valve-stop, whereby, on the traveling movement of the weight, said beam-stop is shiftable to lock, through the medium of the actuator-locker, the valve shut, and whereby, on the opening of the valve, the valve-stop is shiftable to lock, through the medium of said actuator-locker, the weight in its normal effective position.

31. The combination with a supply-valve having a shiftable stop, of weighing mechanism embodying beam mechanism provided with a traveling weight; a shiftable stop carried by said beam mechanism and operative to engage the valve-stop; and an actuator-locker carried by said beam mechanism and provided with a plurality of cam-faced members, one operative through the coaction of the beam and valve stops to lock the weight in its effective position when the valve is open, and also operative to shift said beam-stop on the traveling of the weight, thereby to lock the valve shut, and the other cam-faced member operative when the weight is in its ineffective position to limit the movement thereof.

32. The combination with a supply-valve provided with a shiftable stop, of weighing mechanism embodying beam mechanism provided with a traveling weight; a rock-shaft carried by said beam mechanism; a stop carried by said rock-shaft and adapted to coact with the valve-stop; and a cam-faced actuator-locker carried by said rock-shaft, and operative on the traveling of the weight to shift said beam-stop into position to lock the valve closed, and also operative, on the coaction of the valve and beam stops, when the valve is open, to lock said weight in its effective position.

33. The combination of a supply-valve provided with a shiftable stop; a load-receiver; beam mechanism supporting said receiver and embodying a rolling weight; a rock-shaft carried by said beam mechanism; a stop carried by said rock-shaft and coacting with the valve-stop; and an actuator-locker also carried by said rock-shaft and adapted to lock, through the coaction of said stops, the weight in its effective position when the valve is open, and adapted to actuate said stops into position relatively to each other to lock the valve shut on the traveling movement of the weight.

34. The combination with a supply-valve having a stop movable in the same plane of movement therewith, of weighing mechanism embodying beam mechanism provided with a traveling weight; a rock-shaft carried by said beam mechanism; a stop carried by said rock-shaft and movable with the beam mechanism in the same plane of movement as the valve-stop, and also having a movement with the rock-shaft in a plane intersecting the plane of movement of said valve-stop; and a cam-faced actuator-locker carried by said rock-shaft and operative, when the valve is open, through the coaction of the valve and beam stops, to lock the beam-weight in its effective position, and also operative on the traveling movement of the weight, when the valve is closed, to shift said beam-stop into position to lock such valve shut.

35. In a weighing-machine, the combination of framework; weighing mechanism carried thereby and embodying beam mechanism; a load-discharge-operated regulator; and means carried by said framework and connected with the regulator and coacting with the beam mechanism to lock said regulator against movement during a predetermined period.

36. The combination of a cam-faced bracket; a stream-controller and a shiftable member carried by said stream-controller, one part thereof adapted to engage said cam-faced bracket thereby to receive the strain of said stream-controller when in its open position.

37. The combination with framework, of a supply-valve carried thereby; a cam-faced bracket carried by said framework; a toggle member carried by said valve and having a part thereof in engagement with said cam-faced member, whereby, when said valve is in its open position, the strain thereof is carried by said bracket.

38. The combination of a load-receiver provided with a shiftable member operative to discharge a load; a beam supporting said receiver; and locking means adapted to lock said shiftable member in one position, and having a part thereof carried by said beam.

39. In a weighing-machine, the combination of weighing mechanism embodying beam mechanism; stream-controlling means for controlling the supply of material to said weighing mechanism; regulator mechanism; means connected with the regulator mechanism and stream-controlling means and coacting with a part of the weighing mechanism for maintaining said stream-controlling means in operation; and means connected with the regulator mechanism and coacting with the beam mechanism for maintaining said regulator mechanism against movement at one predetermined period, and thereby prevent movement of the valve mechanism.

40. The combination with a load-receiver provided with a shiftable closer, of beam mechanism supporting said receiver and embodying a traveling weight; and locking means for locking said closer shut, and comprehending a pair of locking members, one carried by the beam mechanism and the other by the closer.

41. The combination of a load-receiver provided with a shiftable closer; beam mechanism supporting said receiver and embodying a rolling weight; and locking means for locking said closer shut, and comprehending a pair of locking members, one comprising a rod pivotally connected to the closer, and the other a depending locker carried by the beam mechanism and coacting to lock the closer shut.

42. The combination of a load-receiver provided with a closer shiftable to discharge a load; beam mechanism supporting said receiver and embodying a traveling weight; means for locking said closer shut, and comprehending a member carried by the closer, and an oscillatory locking member carried by the beam mechanism, and operative to unlock said closer on the traveling movement of the weight.

43. The combination of a stream-controller; a load-receiver provided with a shiftable member operative to discharge a load; beam mechanism embodying a traveling weight; locking means for said weight and stream-controller, and operative when the stream-controller is open to lock the weight in its effective position, and operative on the traveling movement of the weight to lock the stream-controller shut; and locking means for the shiftable member and operative on the traveling movement of the weight to unlock said member.

44. The combination of a supply-valve; a member operative therewith; a load-receiver having a shiftable closer; a member operative with said closer; beam mechanism supporting said receiver and embodying a traveling weight; and a pair of lockers carried by said beam mechanism, one coacting with the valve member and the other with the closer member, and operative on the traveling movement of the weight to lock the valve shut and unlock the closer, and then unlock the valve and lock the closer shut.

45. The combination of a supply-valve provided with a shiftable stop; a load-receiver provided with a shiftable closer also having a stop operative therewith; beam mechanism comprehending a traveling weight; a pair of stops carried by said beam mechanism and coacting with the valve-stop and closer-stop; an actuator carried by said beam mechanism, and operative on the traveling movement of the weight to shift said beam-stops into position to lock the valve shut and unlock the closer; and supplemental locking means for said closer, and operative by the traveling weight to unlock the same.

46. The combination of valve mechanism; a load-receiver provided with a shiftable closer; beam mechanism supporting said receiver and embodying a traveling weight; main locking means for said closer; supplemental locking means therefor; and locking means for the valve, and all operative on the traveling movement of the weight to lock the valve shut and unlock the closer, and thereby permit the same to open.

47. The combination of stream-controlling means; a load-receiver having stream-discharge means; beam mechanism supporting said receiver and embodying traveling counterbalancing means; locking means operative to lock the stream-controlling means shut when the counterbalancing means is in its ineffective position, and operative to lock the counterbalancing means in its effective position when the stream-controlling means is open; main locking means operative to lock the stream-discharge means shut; and supplemental locking means also operative to lock the stream-discharge means shut.

48. The combination of stream-controlling means; a load-receiver having stream-discharge means; beam mechanism supporting said receiver and embodying traveling counterbalancing means; locking mechanism operative to lock the stream-controlling means shut when the counterbalancing means is in its ineffective position, and operative to lock the counterbalancing means in its effective position when the stream-controlling means is open; main locking mechanism operative to lock the stream-discharge means shut, and also operative to assist in locking the stream-controlling means closed; and supplemental locking mechanism also operative to lock said stream-discharge means shut, said locking mechanisms all being operative on the traveling movement of the counterbalancing means.

49. The combination of stream-controlling means; a load-receiver having stream-discharge means; beam mechanism supporting said receiver and embodying traveling counterbalancing means; locking mechanism operative to lock the stream-controlling means shut when the counterbalancing means is in its ineffective position, and operative to lock the counterbalancing means in its effective position when the stream-controlling means is open; main locking mechanism operative to lock the stream-discharge means shut, and also operative to assist in locking said stream-controlling means closed; and supplemental locking mechanism also operative to lock the stream-discharge means shut, said locking mechanisms being operative, first, to lock the counterbalancing means, and then, on the traveling movement of said counterbalancing means, to lock the stream-controlling means shut and simultaneously unlock the stream-discharge main locking means, and then operative to unlock the stream-discharge supplemental locking means, and thereby effect the discharge of the load.

50. The combination of stream-controlling means; a load-receiver having stream-discharging means; beam mechanism supporting said load-receiver and operative to lock the stream-controlling means shut, and then unlock the stream-discharging means and permit the discharge of the load.

51. The combination of stream-controlling means; a load-receiver having stream-discharging means; beam mechanism supporting said load-receiver and embodying traveling counterbalancing means; and means operative by said traveling counterbalancing means first to lock the stream-controller shut, and then to unlock the stream-discharging means.

52. The combination of stream-controlling means; a load-receiver; beam mechanism supporting said receiver; and means supported independently of said receiver and in non-engagement with the beam mechanism, but having an engagement, during a predetermined period, with a part of said receiver, and operative through the medium of said receiver, when maintained in its load-receiving position by the beam mechanism, to maintain the stream-controlling means in operation and permit a supply of material to said receiver.

53. The combination of stream-controlling means; a load-receiver having a shiftable member operative to discharge a load; beam mechanism supporting said receiver; and means supported free of said load-receiver and in non-engagement with said beam mechanism, but coacting with a part of said shiftable member, during a predetermined period, to maintain the stream-controlling means open during the period in which said load-receiver is maintained in its load-receiving position by said beam mechanism.

54. The combination of a supply-valve; a load-receiver having a shiftable closer; beam mechanism supporting said receiver and embodying a traveling weight; and means supported free of said load-receiver and in non-engagement with said beam mechanism, but coacting with a part of said closer, when said beam mechanism is in its normal position, to maintain the valve open.

55. The combination of a supply-valve; a load-receiver; beam mechanism supporting said receiver; means connected with said valve and supported in position free of said receiver and in non-engagement with said beam mechanism, but having a bearing engagement with a part of said load-receiver at one period, whereby it is operative by the beam mechanism, through the medium of the receiver on the ascent thereof, to open said valve.

56. The combination of stream-controlling means; a load-receiver; beam mechanism supporting said receiver; regulator mechanism; and means connecting said regulator mechanism with said stream-controlling means, and coacting with the load-receiver to maintain said stream-controlling means open.

57. The combination of a stream-controller; a load-receiver; beam mechanism supporting said receiver; regulator mechanism; and means connecting said regulator mechanism with said stream-controller, and coacting with the load-receiver, whereby, by means of said load-receiver, the stream-controller will be opened and then maintained open.

58. The combination of a supply-valve; a load-receiver; beam mechanism embodying a traveling weight supporting said load-receiver; regulator mechanism; and connecting means intermediate said regulator mechanism and supply-valve, and coacting with the load-receiver, whereby, by means of the beam mechanism, through the medium of the load-receiver, the valve will be opened and maintained open.

59. The combination of a supply-valve; a load-receiver provided with a projection; beam mechanism supporting said load-receiver; a regulator; and connecting means between said regulator and supply-valve, and embodying a member coacting with said projection, whereby the beam mechanism, through the medium of the receiver, is adapted to open and maintain the valve open.

60. The combination of a stream-controller; a load-receiver provided with a projection; beam mechanism supporting said load-receiver; and means supported in position and operatively connected to said stream-controller, and embodying a member coacting with said projection, whereby the beam mechanism, through the medium of the receiver, is adapted to open and maintain the valve open.

61. The combination with framework, of a supply-valve; a load-receiver provided with a projection constituting a fulcrum; beam mechanism supporting said receiver; regulator mechanism; an actuator connected with said regulator mechanism and framework, and adapted to engage the receiver projection; and a connector intermediate said supply-valve and actuator, whereby, on the return of the beam mechanism to its normal position, and the consequent ascent of the load-receiver, said supply-valve will be opened.

62. The combination with framework, of a supply-valve; a load-receiver having a projection constituting a fulcrum; a regulator having a counterbalancing-weight of greater gravity than the valve; beam mechanism supporting said receiver; an actuator connected with said regulator and framework; and a connector secured to said valve and to said actuator, whereby, on the ascent of the receiver, due to the return of the beam mechanism to its effective position, the supply-valve is opened and maintained open.

63. The combination with framework, of a supply-valve; a load-receiver provided with a projection constituting a fulcrum; beam mechanism supporting said receiver and embodying a traveling weight; regulator mechanism; an actuator connected with said regulator and framework, and in position to engage said receiver projection; and a connector secured to said actuator and valve, whereby, on the ascent of the load-receiver, through the medium of the traveling weight and the consequent engagement of the projection with said actuator, the supply-valve is opened and maintained open.

64. The combination of a supply-valve; a load-receiver; connecting mechanism in operative engagement with said receiver and supply-valve, and operative by the beam mechanism, through the medium of the receiver on the ascent thereof, to open and lock said valve open; and locking means operative by the beam mechanism to maintain said valve shut.

65. The combination of stream-controlling means; a load-receiver; beam mechanism embodying a traveling weight; connecting mechanism coacting with said load-receiver and with said stream-controlling means, and operative by the beam mechanism, on the ascent of the load-receiver, to open and lock said valve open; and locking means operative by the traveling weight, on the descent of the load-receiver, to maintain said valve shut.

66. The combination of a supply-valve; a load-receiver; beam mechanism supporting said receiver; means supported in position independently of said receiver and in non-engagement with the beam mechanism, but coacting, during a predetermined period, with a part of said load-receiver, whereby it is operative, through the medium of said receiver, when maintained in one, or its load-receiving, position, by the beam mechanism, to maintain the valve open; and supplemental means also operative to maintain the valve open at another position of said receiver.

67. The combination of stream-controlling means; a load-receiver having a projection; beam mechanism supporting said receiver; means supported in position and coacting with said receiver projection and operative to maintain the valve open in one position of said load-receiver and until the projection is free of said coacting means; and supplemental means carried by said receiver and operative to engage and maintain said stream-controlling means open after the release of the first maintaining means and at another position of said receiver.

68. The combination of a supply-valve; a load-receiver having a projection constituting a fulcrum; beam mechanism supporting said load-receiver; regulator mechanism; means secured to said regulator mechanism and coacting with said load-receiver to open and maintain said valve open; and supplemental means operative to maintain the valve open during a partial descent of the receiver and after the disengagement of the projection with said coacting means.

69. The combination of a supply-valve having a depending arm; a load-receiver having a projection; beam mechanism supporting said receiver; an actuator in position to engage said projection, and connected with said valve, whereby, on the ascent of said receiver, said valve is opened, and during the major part of the loading period of said receiver is maintained open; and means carried by said receiver and adapted to engage said depending arm when the receiver descends into position to disengage the said projection and actuator, and thereby maintain the valve open during the final part of the loading period of the receiver.

70. The combination with framework, of a supply-valve having a depending arm; a load-receiver having a projection; beam mechanism supporting said load-receiver; a regulator; an actuator connected with said framework and regulator, and adapted to engage said projection; a connector secured to said actuator and valve, whereby, on the ascent of said receiver the valve is opened and maintained open; and a by-pass carried by said receiver and adapted to engage said depending arm, thereby to maintain the valve open after the disengagement of said projection and actuator.

71. The combination with framework, of a supply-valve having a depending arm; a load-receiver having a projection; beam mechanism supporting said load-receiver; a regulator; an actuator connected with said framework and regulator, and adapted to engage said projection; a connector secured to said actuator and valve, whereby, on the ascent of said receiver, the valve is opened and maintained open; a by-pass carried by said receiver, and adapted to engage said depending arm, thereby to maintain the valve open after the disengagement of said projection and actuator; and locking means operative by the beam mechanism to lock said valve closed.

72. The combination with framework, of a supply-valve having a depending arm; a load-receiver having a projection; beam mechanism supporting said receiver and embodying a traveling weight; a regulator; an actuator connected with said framework and regulator, and adapted to engage said projection; a connector secured to said actuator and valve, whereby, on the ascent of said receiver, the valve is opened and maintained open; a by-pass carried by said receiver, and adapted to engage said depending valve-arm, thereby to maintain the valve open after the disengagement of said projection and actuator; and locking means operative by the traveling weight to lock said valve closed.

73. The combination of a load-receiver provided with a shiftable closer; beam mechanism supporting said load-receiver; main locking means for said closer, and operative by the beam mechanism to unlock said closer; supplemental locking means for said closer likewise operative by the beam mechanism to unlock the same; stream-controlling means; and connecting means coacting with the load-receiver and with said stream-controlling means, and also adapted to assist in locking said closer shut.

74. The combination of a load-receiver provided with a shiftable closer; beam mechanism supporting said load-receiver; main locking means for said closer and operative by the beam mechanism to unlock said closer; supplemental locking means for said closer likewise operative by the beam mechanism to unlock the same; stream-controlling means; and connecting means coacting with the load-receiver and with said stream-controlling means, and adapted to assist in locking said closer shut, and also adapted to open and maintain the valve open on the ascent of said load-receiver.

75. The combination of a load-receiver having a closer and a projection; beam mechanism supporting said load-receiver; regulator mechanism; valve mechanism; main locking means for said closer and controlled by the beam mechanism; supplemental locking means for said closer and also controlled by the beam mechanism; connecting means intermediate the regulator and valve mechanism, and coacting with the load-receiver to open and maintain the valve open, and coacting with the closer to assist in locking said closer shut.

76. The combination of a load-receiver having a closer and a projection; beam mechanism supporting said load-receiver and embodying a traveling weight; regulator mechanism; valve mechanism; main locking means for said closer and controlled by the beam mechanism; supplemental locking means for said closer, and also controlled by the beam mechanism and operative on the traveling movement of the weight to effect the discharge of a load; and means intermediate the regulator and valve mechanism, and coacting with the load-receiver to open and maintain the valve open, and coacting with the closer to assist in locking said closer shut.

77. In a weighing-machine, the combination with beam mechanism embodying a beam and a weight; a load-receiver carried by said beam mechanism; and means operative to lock said beam mechanism in its ineffective position and embodying a locking member supported in permanent juxtaposition to said beam and operative at a predetermined period directly to engage said beam and thereby lock said beam mechanism against movement after the descent of said load-receiver with its load.

78. In a weighing-machine, the combination of weighing mechanism; stream-controlling means for regulating the supply of material thereto; main means for maintaining said stream-controlling means in operation; and means for locking said stream-controlling means in its operative position during a predetermined period, thereby to prevent tampering therewith.

79. In a weighing-machine, the combination of weighing mechanism embodying beam mechanism; a load-discharge-operated regulator; a valve for controlling the supply of material to the weighing mechanism; main means for maintaining said valve open; and means coacting with the regulator and beam mechanism for locking said valve open during a predetermined period, and thereby prevent tampering therewith.

80. The combination of weighing mechanism embodying beam mechanism provided with traveling counterbalancing means; and means for locking said beam mechanism in its ineffective position and said weight in its inefficient position.

81. In a weighing-machine, the combination of weighing mechanism embodying beam mechanism having a stop; a regulator; and means connected with said regulator and embodying a member coacting with said stop to lock the regulator against movement.

82. The combination of pivotally-supported beam mechanism having a traveling weight movable toward the beam-axis; regulator mechanism; and means operative by the regulator mechanism to lock said weight in its ineffective position.

83. In a machine of the class specified, the combination of beam mechanism embodying a rolling weight; regulator mechanism; a locker operatively connected with said regulator mechanism and adapted to engage said beam mechanism, and thereby lock said beam mechanism and maintain said weight in their ineffective positions.

84. In a weighing-machine, the combination of weighing mechanism embodying beam mechanism; valve mechanism for controlling the supply of material to said weighing mechanism; regulator mechanism; means connected with the regulator mechanism and with the valve mechanism, and coacting with a part of the weighing mechanism for maintaining said valve mechanism open; and means connected with the regulator mechanism, and coacting with the beam mechanism for maintaining said regulator mechanism against movement at one predetermined period, and thereby prevent the valve mechanism from shutting, said means being operative after the shifting of the beam mechanism to lock said beam mechanism in its ineffective position on the operation of said regulator mechanism.

85. The combination with framework, of beam mechanism supported thereby, and comprehending a weight-supporting instrumentality having a stop; a traveling weight carried by said instrumentality; regulator mechanism; a locker secured to said framework and adapted to engage said stop, and operatively connected with the regulator mechanism, thereby to lock the weight in its ineffective position and maintain said weight-supporting instrumentality in its raised position.

86. The combination of a load-receiver having a shiftable member operative to discharge a load; beam mechanism supporting said receiver; stream-controlling means; means operated by the discharging stream on the discharge of a load; and mechanism operatively connected with said discharge-stream-operated means, and one part thereof operative to lock the shiftable member open, another part operative to lock the beam mechanism in its ineffective position, and another part operative to open and maintain the stream-controlling means open.

87. The combination of a load-receiver provided with a closer; beam mechanism supporting said receiver; valve mechanism; regulator mechanism; and mechanism connected with said regulator mechanism, one part thereof operative to lock the closer open, another part thereof operative to lock the beam mechanism in its ineffective position, and another part thereof operative by means of said beam mechanism to open and maintain the valve mechanism open; said mechanism being timed and operative during the return movement of the regulator mechanism successively to unlock the closer from its open position, then to unlock the beam mechanism, and then to open and maintain said valve mechanism open.

88. The combination of a load-receiver provided with a shiftable member operative to discharge a load; beam mechanism supporting said receiver; main locking means for said shiftable member, and operative by the beam mechanism to unlock the same; and supplemental locking means for said shiftable member, likewise operative by the beam mechanism completely to unlock said shiftable member.

89. The combination of a load-receiver provided with a shiftable member operative to discharge a load; beam mechanism supporting said receiver and embodying traveling counterbalancing means; main locking means for said shiftable member, and operative by the beam mechanism to unlock the same; and supplemental locking means for said shiftable member and operative by the traveling counterbalancing means completely to unlock said shiftable member.

90. The combination of a load-receiver provided with a shiftable member operative to discharge a load; beam mechanism supporting said receiver, and embodying traveling counterbalancing means; main locking means for said shiftable member and operative by said beam mechanism, on the traveling of the counterbalancing means into its inefficient position, to unlock the same; and supplemental locking means for said shiftable member, and directly operative by the traveling counterbalancing means, thereby completely to unlock the shiftable member.

91. The combination of a load-receiver provided with a shiftable closer; beam mechanism supporting said receiver and embodying a traveling weight; main locking means for said closer; and supplemental locking means for said closer and operative by the traveling weight, thereby completely to unlock said closer.

92. The combination of a load-receiver provided with a shiftable member operative to discharge a load; beam mechanism supporting said receiver and embodying a traveling weight; and means operative by the weight when in its normal position to maintain the shiftable member locked shut, and operative by said weight on its movement to its ineffective position to unlock said shiftable member.

93. The combination of beam mechanism having a traveling weight; and a shiftable locker for said weight comprising a pair of connected members having a spring intermediate thereof.

94. The combination of beam mechanism having a traveling weight; and a pair of pivotally-connected members operative during a predetermined period to maintain said weight in its effective position.

95. In a machine of the class specified, the combination of a beam mechanism having a traveling weight; and means operative during a predetermined period to maintain said weight in its effective position, said means comprising a pair of shiftable members, one shiftable relatively to the other, and both shiftable as a whole at one predetermined period during the operation of the machine.

96. The combination, with weighing mechanism embodying beam mechanism provided with a traveling weight, of regulator mechanism; means operative thereby in one position of said regulator mechanism to lock the beam mechanism, and thereby the weight, in its inefficient position; and means operative by said regulator mechanism when in its normal position to lock said weight in its efficient position.

97. The combination with weighing mechanism embodying beam mechanism having a traveling weight, of main locking means for locking said weight in its normal effective position; and supplemental means for also maintaining said weight in said position.

98. The combination of weighing mechanism embodying beam mechanism provided with traveling counterbalancing means; a stream-controller; means operative by said stream-controller for locking said counterbalancing means in its normal effective position; regulator mechanism; and means operatively connected therewith and adapted also to lock said counterbalancing means in its normal effective position.

99. The combination with beam mechanism embodying a traveling weight, of means for locking said weight in its effective position; and means for locking said beam mechanism in its ineffective position.

100. The combination with beam mechanism embodying a traveling weight, of main locking means for locking said weight in its effective position; supplemental locking means for also locking said weight in its effective position; and means for locking said beam mechanism in its ineffective position.

101. The combination with stream-controlling means, of weighing mechanism embodying beam mechanism having a traveling weight; regulator mechanism; means operative by the regulator mechanism for locking said beam mechanism, and thereby the weight, in its ineffective position; means operative by said regulator mechanism for locking said weight in its effective position; and means operative by the stream-controller for also locking said weight in its effective position.

102. The combination with stream-controlling means, of weighing mechanism embodying beam mechanism provided with a traveling weight; regulator mechanism; means operative by the regulator mechanism for locking said beam mechanism and thereby the weight in its ineffective position; means operative by the regulator mechanism for locking said weight in its effective position; and means operative by the stream-controller for also locking said weight in its effective position, and operative in turn by said weight for locking said stream-controller shut.

FRANCIS H. RICHARDS.

Witnesses:
C. A. WEED,
EDWARD A. MEAD.